(12) United States Patent
Bond

(10) Patent No.: US 9,105,085 B2
(45) Date of Patent: Aug. 11, 2015

(54) METHODS AND APPARATUS FOR ALIGNING SETS OF MEDICAL IMAGING DATA

(71) Applicant: Sarah Bond, Oxford (GB)

(72) Inventor: Sarah Bond, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 43 days.

(21) Appl. No.: 13/651,778

(22) Filed: Oct. 15, 2012

(65) Prior Publication Data

US 2013/0094738 A1    Apr. 18, 2013

(30) Foreign Application Priority Data

Oct. 14, 2011  (GB) .................................. 1117811.8

(51) Int. Cl.
  *G06K 9/00*       (2006.01)
  *G06T 7/00*       (2006.01)
(52) U.S. Cl.
  CPC ..... *G06T 7/0028* (2013.01); *G06T 2207/10081* (2013.01); *G06T 2207/10104* (2013.01); *G06T 2207/10108* (2013.01); *G06T 2207/30101* (2013.01)
(58) Field of Classification Search
  None
  See application file for complete search history.

(56) References Cited

U.S. PATENT DOCUMENTS

| | | | |
|---|---|---|---|
| 8,675,939 B2* | 3/2014 | Moctezuma de la Barrera | 382/131 |
| 8,744,148 B2* | 6/2014 | Nord et al. | 382/128 |
| 2003/0190091 A1* | 10/2003 | Stewart et al. | 382/294 |
| 2006/0093209 A1* | 5/2006 | Guetter et al. | 382/159 |
| 2007/0047840 A1 | 3/2007 | Xu et al. | |
| 2007/0081707 A1* | 4/2007 | Sirohey et al. | 382/128 |
| 2009/0129650 A1* | 5/2009 | Hawkes et al. | 382/131 |
| 2009/0238434 A1* | 9/2009 | Feke et al. | 382/132 |
| 2011/0069873 A1 | 3/2011 | Azemoto et al. | |
| 2011/0085716 A1* | 4/2011 | Chefd'hotel et al. | 382/128 |
| 2011/0150311 A1* | 6/2011 | Bond et al. | 382/131 |
| 2011/0170751 A1* | 7/2011 | Mangoubi et al. | 382/128 |
| 2012/0134562 A1* | 5/2012 | Boettger et al. | 382/131 |
| 2012/0170823 A1 | 7/2012 | Li et al. | |

OTHER PUBLICATIONS

Ashburner et al ("Multimodal Image Coregistration and Partitioning—A Unified Framework", 2008).*
Makela et al ("A review of cardiac image registration methods", 2002).*
Goetze et al., "Prevalence of misregistration between SPECT and CT for attenuation-corrected myocardial perfusion SPECT," Journal of Nuclear Cardiology (2007), pp. 200-206.
He et al., "Reorientation of the Left Ventricular Long-Axis on Myocardial Transaxial Tomograms by a Linear Fitting Method," the Journal of Nuclear Medicine, vol. 32, No. 9 (1991), pp. 1794-1800.

* cited by examiner

*Primary Examiner* — Avinash Yentrapati
(74) *Attorney, Agent, or Firm* — Schiff Hardin LLP

(57) ABSTRACT

In a method and apparatus for aligning two sets of medical imaging data, first and second sets of image data are obtained respectively, using first and second different medical imaging modalities, of an anatomical feature of a subject. For each set, an axis of the anatomical feature and a landmark point for the anatomical feature is determined, and the first and second sets are aligned by comparing the respective axes and landmark points.

6 Claims, 5 Drawing Sheets

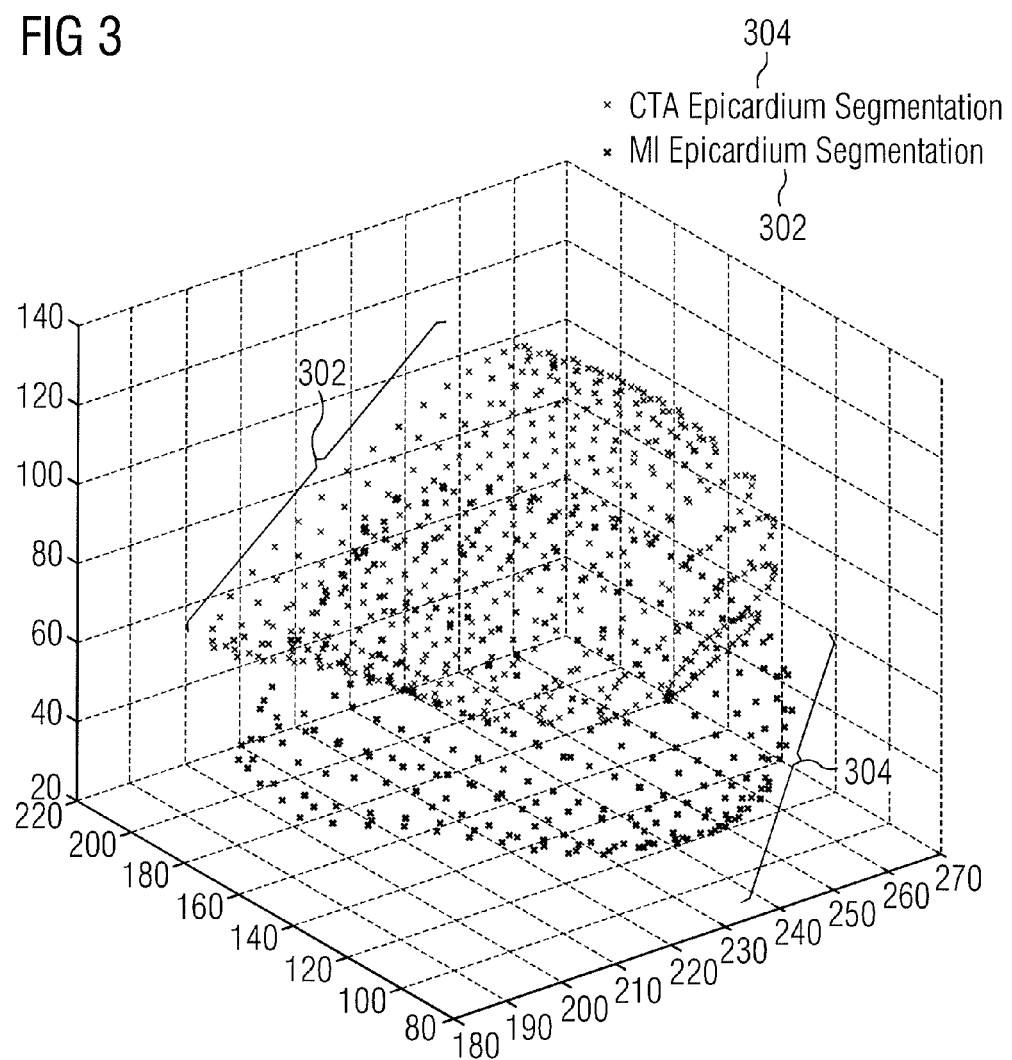

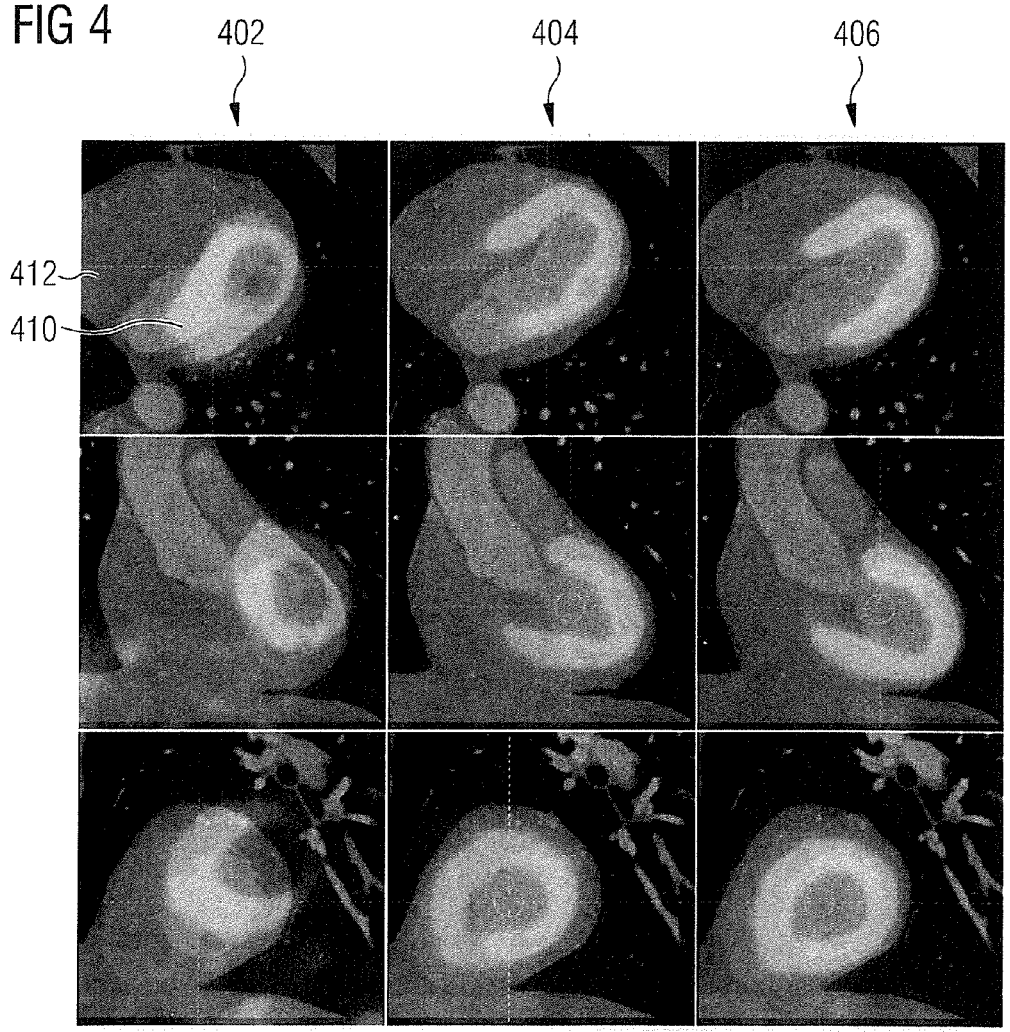

METHODS AND APPARATUS FOR ALIGNING SETS OF MEDICAL IMAGING DATA

BACKGROUND OF THE INVENTION

1. Field of the Invention

This invention is directed to methods and apparatus for aligning two sets of medical imaging data, in particular two sets, captured using different medical imaging modalities, showing an anatomical feature of a subject.

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions. Other such functional imaging modalities are known, such as SPECT.

In such functional images, many important pathologies and anatomical structures appear as very high (or low) intensities. For example, a tumor in an FDG-PET image will often appear as a bright region In cardiac medical imaging, CTA is a high resolution gated cardiac scan that enables the clinician to assess the coronary arteries, the wall motion of the heart and the thickness of the myocardium in order to assess the likelihood and extent of coronary artery disease.

PET (or SPECT) is used in numerous complementary ways, either gated, dynamic, or static, to assess the perfusion of the LV and effects that any CAD is having on the left ventricle (LV) that may not be picked up by the CTA. In particular CFR, which looks at the coronary flow reserve between rest and stress, often highlighting problems before they become apparent on the CTA.

In many cases CTA and PET (or SPECT) are used in combination with each other in order to more accurately assess the diagnosis and extent of cardiac disease. However in order to do this a good alignment between the CTA and PET is required. It is useful for example to assess the positions of the coronaries relative to the PET data in order to see if low flow/perfusion/CFR in the PET is due to a particular blockage in one of the coronaries.

Alignment becomes difficult because the CTA images are 'snapshots' of single timepoints, whereas the PET data are averaged over a period of time, and therefore the question arises: what is a good alignment?

The CT application 'Circulation' has tried to align such different types of data using a Mutual Information based registration directly on the two datasets. This approach runs into a series of problems as often the whole body may be well aligned but the LV itself is poorly aligned.

Examples of such alignments are given in FIG. 1. FIG. 1 illustrates a series of different types of alignments, each having significant difficulties in producing a good alignment between the two images. The CTA image (104) is detailed, whereas the data from the PET image (102) is more blurred, having been averaged over the time period of the PET scan. From the initial alignment, mutual information is used, then correlation ratio, then normalized mutual information; each has difficulty in one way or another.

Similar issues arise in other modalities matching averaged medical images with short or snapshot images.

SUMMARY OF THE INVENTION

An object of the present invention to address these problems and provide improvements upon the known devices and methods.

In general terms, in an embodiment of a method of aligning two sets of medical imaging data in accordance with the invention, a first set of image data is obtained, using a first medical imaging modality, of an anatomical feature of a subject; and a second set of image data, of the anatomical feature of the subject is obtained using a second imaging modality. For each set, an axis of the anatomical feature and a landmark point for the anatomical feature are determined. The first and second sets are aligned by comparing the respective axes and landmark points.

This allows a more robust method of aligning the anatomical feature in the data sets from different modalities.

Preferably, the method further includes determining a segmentation of the anatomical feature for the first and second sets, wherein the step of aligning further comprises comparing the segmentation of the feature in the first and second sets.

Suitably, the step of comparing the segmentation is used to refine the alignment determined by comparing the axes and landmark points.

In an embodiment, the landmark point of the feature is associated with the axis.

Suitably, the first medical imaging modality is a functional imaging modality, and wherein the second modality is an anatomical imaging modality.

In one embodiment, the feature is the left ventricle of the heart of the subject.

Preferably, the landmark is the apex of the left ventricle.

In an embodiment, the step of aligning is a rigid registration.

The invention also encompasses an apparatus for aligning two sets of medical imaging data, having a processor provided with a first set of image data, obtained using a first medical imaging modality, of an anatomical feature of a subject, and provided with a second set of image data of the anatomical feature of the subject, for each set, obtained with a second imaging modality. The processor is configured to determine, an axis of the anatomical feature and a landmark point for the anatomical feature, and to align the first and second sets by comparing the respective axes and landmark points. A display device is configured to display the aligned two sets of imaging data.

The present invention also encompasses a non-transitory, computer-readable data storage medium encoded with programming instructions that, when the storage medium is loaded into a processor, cause the processor to implement one or more of the embodiments of the method according to the invention described herein.

The above aspects and embodiments may be combined to provide further aspects and embodiments of the invention.

BRIEF DESCRIPTION OF THE DRAWINGS

FIG. 3 illustrates another embodiment of the method according to the invention.

FIG. 4 illustrates results of an alignment according to an embodiment of the invention.

DESCRIPTION OF THE PREFERRED EMBODIMENTS

When the following terms are used herein, the accompanying definitions can be applied:

PET—Positron Emission Tomography
SUV—Standardized Uptake Value
ROI/VOI—Region/volume of interest.
LV—Left Ventricle
CT—Computed Tomography
CTA—CT Angiography
CFR—Coronary Flow Reserve
CAD—Coronary Artery Disease
(N)MI—(Normalized) Mutual Information
MI—Molecular Imaging (e.g. PET)
CR—Correlation Ratio
AC—Attenuation Correction
ICP—Iterative Closest Point Embodiments of the invention provide methods which align the anatomical feature, such as the left ventricle, by axis and landmark points, rather than by mere comparison of data points, such as in mutual information based registration. This provides a more robust registration, as although the information in the voxels themselves in one modality may be of a different quality (for example, more blurred, if a PET image averaged over a time period and number of counts is used), the characteristics of the anatomical feature should remain reasonably constant.

Features of embodiments of the invention may include:
using the long axis and apex distances to initialize a LV alignment, followed by a refinement step that ensures the two surfaces are also matched.

One embodiment of this invention provides a registration based approach to align a left ventricle in CTA and PET images, the polar plot and the image data using the same methods in order to give the best possible alignment of the data for visualization and quantification:

1. Align the known apex and long axis location—note that there are previously considered methods for finding these locations and aligning them within each modality alone.

2. Align the segmentation points—While the alignment of the long axes and apexes are required, it should be noted that these are calculated using different methods, and therefore may not be consistent in their definition. Consequently a further registration of the segmentation is required to update the long axes and apexes relative to each other.

Figure 2A:
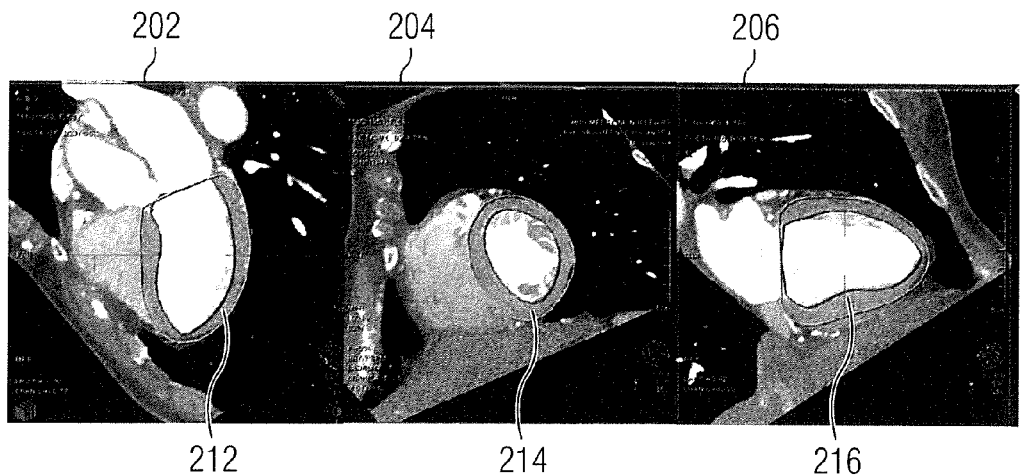
FIGS. 2*a* and 2*b* illustrate alignment in an embodiment of the method according to the invention.
Figure 2B:
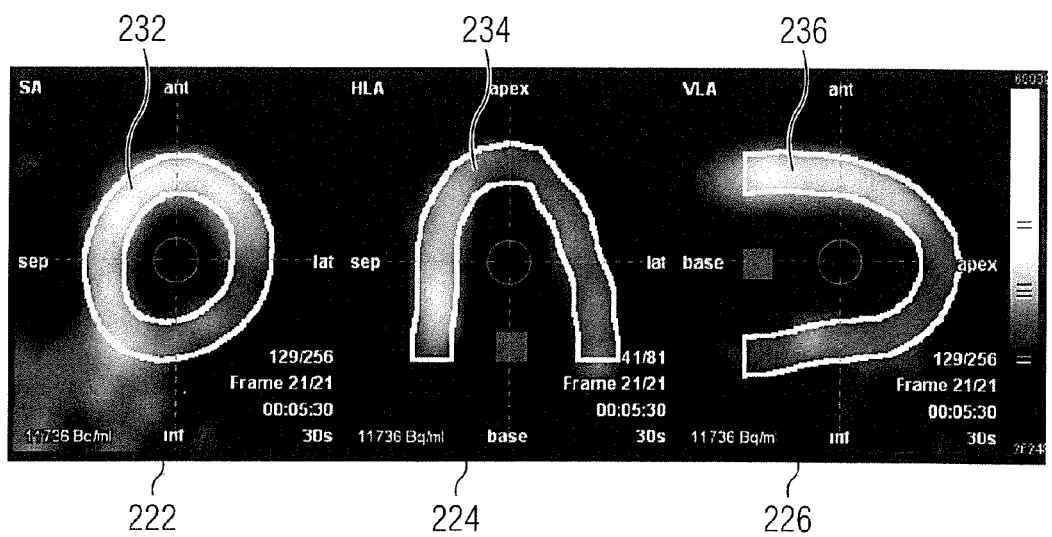

These two segmentations are shown in FIGS. 2a and 2b. FIG. 2a shows the automatic segmentation of the LV in the CTA image data. For each view (204, 204, 206) the segmentation finds the appropriate region (212, 214, 216), segmenting out the myocardium and epicardium, and the LV itself.

FIG. 2b shows the segmentation of the PET data. Again, for each orthogonal view (222, 224, 226) the segmentation finds the myocardium and epicardium, isolating the LV. As can be seen, the segmentation in the PET is far more imprecise, due to the blurred nature of the PET image.

The registration is performed using an Iterative Closest Point (ICP) Algorithm applied to the two segmentations of the CTA and PET data. This provides a rigid alignment of the two LVs. Consequently the apex and long axis of the source image can be updated by this further registration to give an optimum alignment of the two datasets. FIG. 3 shows the two sets of data points plotted in 3D space; the lower set of points (304) is the CTA epicardium segmentation, and the upper (302) the MI epicardium segmentation.

Note also that this registration is rigid and not affine—with no scaling, as it cannot be certain that the relative positions of the base are accurate, due to the different methods used to find them. It is assumed that the size of the heart is consistent overall, though of course this does vary over the cardiac cycle.

In more detail, the initialization of the long axis and apex alignment is performed as follows:

The rotation between the two datasets is then given by:

$$R_{rel} = \begin{pmatrix} & & & 0 \\ & R_{MI}R_{CT}^{-1} & & 0 \\ & & & 0 \\ 0 & 0 & 0 & 1 \end{pmatrix}$$

Where $R_{MI}$ and $R_{CT}$ are the long axis rotations of the MI and CT data respectively.

The initial registration of the datasets involves rotating by $R_{rel}$ about the apex point, and aligning the CT apex, $a_{CT}(x,y,z)$, with the MI apex, $a_{MI}(x,y,z)$.

The translation is given by:

$$R_t = \begin{pmatrix} 1 & 0 & 0 & a_{CT}(x) - a_{MI}(x) \\ 0 & 1 & 0 & a_{CT}(y) - a_{MI}(y) \\ 0 & 0 & 1 & a_{CT}(z) - a_{MI}(z) \\ 0 & 0 & 0 & 1 \end{pmatrix}$$

The shift to the apex is given by:

$$R_a = \begin{pmatrix} 1 & 0 & 0 & a_{MI}(x) \\ 0 & 1 & 0 & a_{MI}(y) \\ 0 & 0 & 1 & a_{MI}(z) \\ 0 & 0 & 0 & 1 \end{pmatrix}$$

Therefore the overall initial transformation is given by:

$$R_{init} = R_t R_a R_{rel} R_a^{-1}$$

Following this, an Iterative Closest Point algorithm can be used for the calculation of the ideal alignment of the datasets. The inputs to the algorithm are two sets of surface points from the CT and the MI, $p_{CT}$ and $p_{MI}$. The basic algorithm is described in the pseudo code below.

```
input p_CT, p_MI
initial transform T=I.
while iterations<max iterations
  transform p_MI
  foreach p_MI,i
    find closest point in p_CT
    match(i)=closest point, if it is less than 25 mm
  compute transform T to map matched points, using SVD
  iteration++
output T
```

For registering CTA, the algorithm can be extended to use both the endocardium and epicardium. These two sequences are matched separately.

```
input p_CT^epi, p_CT^endo, p_MI^epi, p_MI^endo
initial transform T=I.
while iterations<max iterations
  transform p_MI^epi, p_MI^endo
  foreach p_MI,i^epi
    find closest point in p_CT^epi
    match1(i)=closest point, if it is less than 25 mm
  foreach p_MI,i^endo
    find closest point in p_CT^endo
    match2(j)=closest point, if it is less than 25 mm
  compute transform T to map matched points, using SVD
  interation++
output T
```

Figure 1:
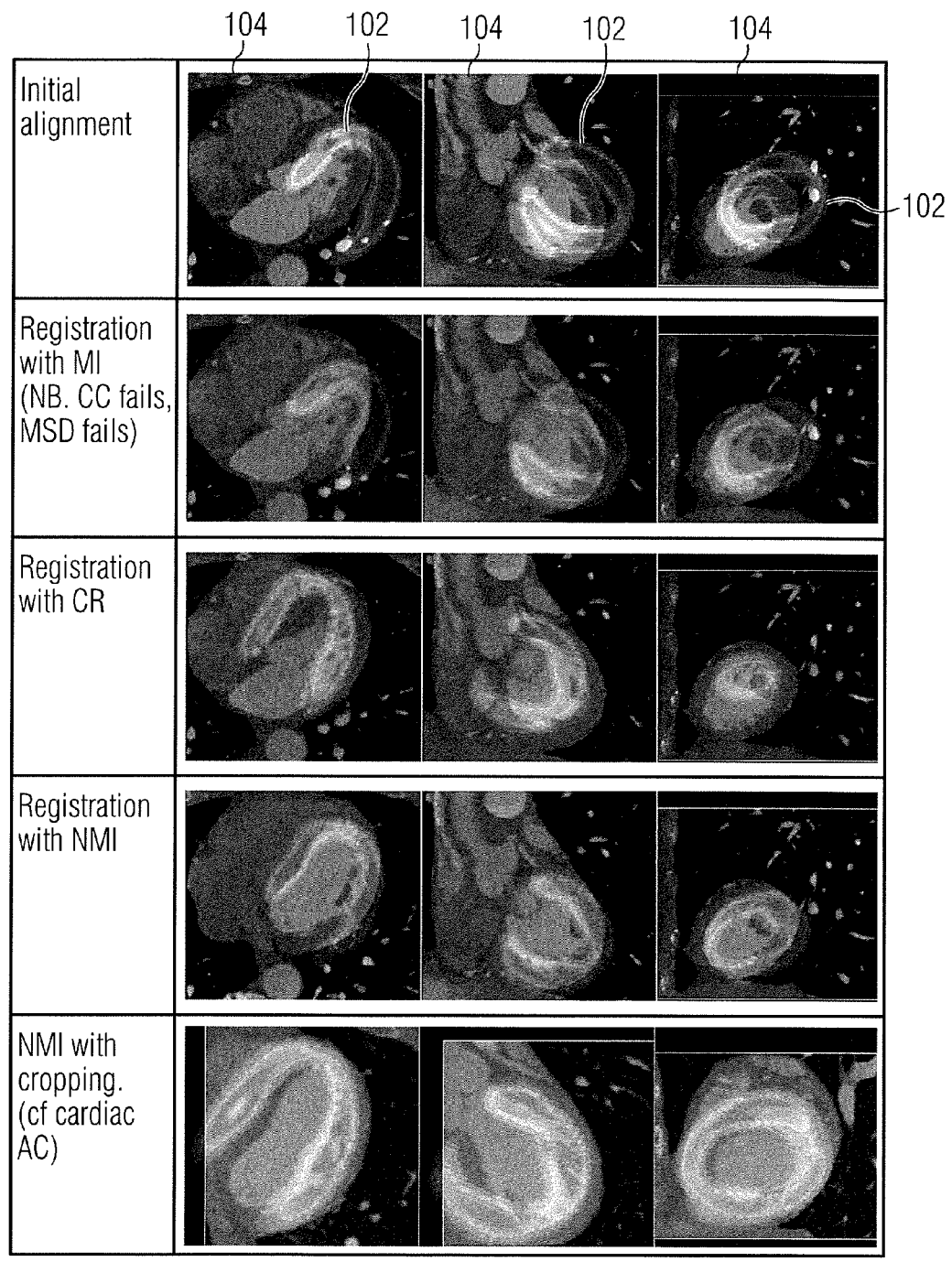
FIG. 1 illustrates several types of unsatisfactory alignment according to the known method.

An example result of the registration for a patient (stress) is shown in FIG. 4. The initial dataset (402) on the left is showing the three orthogonal views with no registration of the CTA data (412) and the MI data (410). The second set of images 404 shows initialization of the registration, and the third set 406 the rigidly registered data with ICP. The results are clearly superior to the prior art alignment attempts shown in FIG. 1.

This invention can be used for different applications where different information about relative positions of a particular anatomy are known, and can be iterated to find the best rigid registration. For example, the anatomical feature in question may be another feature for which an axis can be identified, such as the liver or bladder. The different modalities may of course be other functional modalities (such as SPECT) or anatomical modalities (such as MRI), but may indeed be both from a functional modality, where the first modality used a snapshot image (such as a static PET scan), and the second used a longer study (such as a dynamic PET scan).

Various methods of segmentation are known to the art and could be used for finding the feature for the second refinement step. For the method of matching the segmentations ICP could be replaced with Chamfer distance, or other previously considered techniques.

Figure 5:
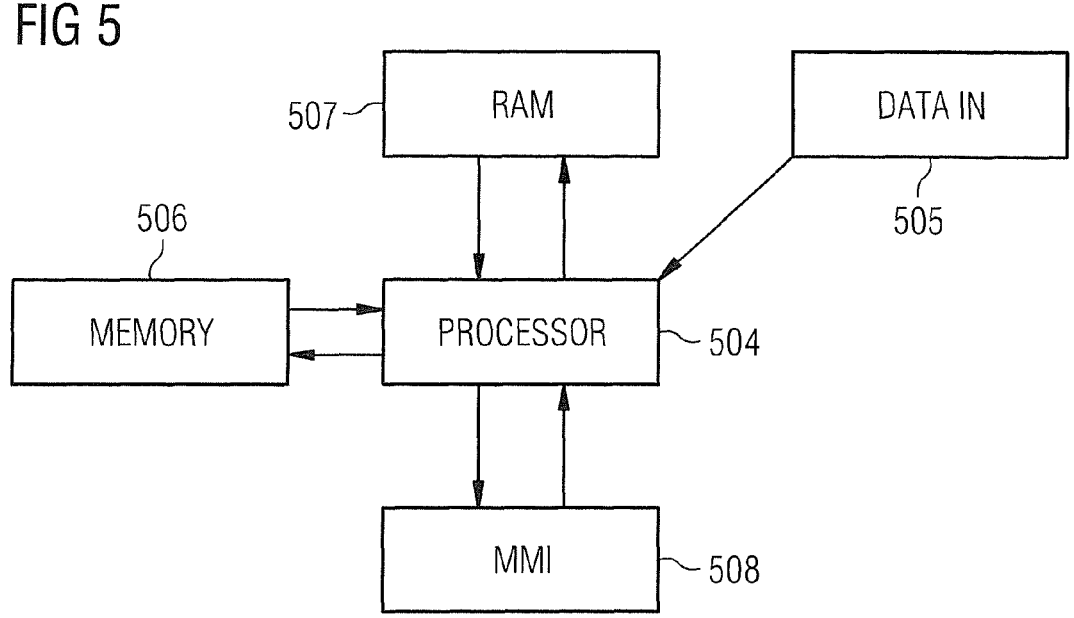
FIG. 5 is a block diagram illustrating the basic components of an apparatus according to an embodiment of the invention.

Referring to FIG. 5, the above embodiments of the invention may be conveniently realized as a computer system suitably programmed with instructions for carrying out the steps of the methods according to the invention.

For example, a central processing unit 504 is able to receive data representative of medical scans via a port 505 which could be a reader for portable data storage media (e.g. CD-ROM); a direct link with apparatus such as a medical scanner (not shown) or a connection to a network.

Software applications loaded on memory 506 are executed to process the image data in random access memory 507.

The processor 504 in conjunction with the software can perform the steps such as obtaining a first set of image data, captured using a first medical imaging modality, of an anatomical feature of a subject; obtaining a second set of image data, captured using a second medical imaging modality, of the anatomical feature of the subject; for each set, determining an axis of the anatomical feature and a landmark point for the anatomical feature; and aligning the first and second sets by comparing the respective axes and landmark points.

A Man—Machine interface 508 typically includes a keyboard/mouse/screen combination (which allows user input such as initiation of applications) and a screen on which the results of executing the applications are displayed.

Although modifications and changes may be suggested by those skilled in the art, it is the intention of the inventor to embody within the patent warranted hereon all changes and modifications as reasonably and properly come within the scope of her contribution to the art.

I claim as my invention:

1. A method of aligning two sets of medical imaging data, the method comprising:
    obtaining a first set of image data, captured using a first medical imaging modality, of an anatomical feature of a subject;
    obtaining a second set of image data, captured using a second medical imaging modality, of the anatomical feature of the subject;
    providing said first and second sets of image data to a computer and for each image data set, determining, in said computer, an axis of the anatomical feature and a landmark point for the anatomical feature, said landmark point being associated with the axis;
    in said computer, determining a segmentation of the anatomical feature from each of the first and second image data sets;
    in said computer, aligning the first and second sets by rigid registration, by comparing the respective axes and landmark points to obtain a first alignment of said first and second image data sets, and refining said first alignment by comparing the segmentation of the feature from the first and second image data sets; and
    making the first and second image data sets in the refined alignment available in electronic form at an output of said computer.

2. A method according to claim 1, wherein the first medical imaging modality is a functional imaging modality, and wherein the second modality is an anatomical imaging modality.

3. A method according to claim 1, wherein the feature is the left ventricle of the heart of the subject.

4. A method according to claim 3 wherein the landmark is the apex of the left ventricle.

5. An apparatus for aligning two sets of medical imaging data, the method comprising:
    a processor configured to obtain a first set of image data, captured using a first medical imaging modality, of an anatomical feature of a subject, obtain a second set of image data, captured using a second medical imaging modality, of the anatomical feature of the subject, for each image data set, to determine an axis of the anatomical feature and a landmark point for the anatomical feature, said landmark point being associated with the axis;
    said processor being configured to determine a segmentation of the anatomical feature from each of the first and second image data sets;
    said processor being configured to align the first and second image data sets by a rigid registration, by comparing the respective axes and landmark points to obtain a first alignment of said first and second image data sets, and refining said first alignment by comparing the segmentation of the feature from the first and second image data sets; and
    a display device in communication with said processor, said processor being configured to cause the two sets of imaging data to be displayed at said display device in the refined alignment.

6. A non-transitory, computer-readable data storage medium encoded with programming instructions, said programming instructions, when said storage medium is loaded into a processor, cause the processor to:
    receive a first set of image data of an anatomical feature of a subject, obtained using a first medical imaging modality;
    receive a second set of image data of said anatomical feature of the subject, obtained using a second medical imaging modality that is different from said first medical imaging modality;
    for each set of image data, determine an axis of the anatomical feature and a landmark point for the anatomical feature, said landmark point being associated with the axis;
    determine a segmentation of the anatomical feature from each of the first and second image data sets;
    align the first and second sets of image data by a rigid registration by comparing the respective axes and landmark points to obtain a first alignment of said first and second image data sets, and by refining said first alignment by comparing the segmentation of the feature from the first and second image data sets; and make the first and second image data sets in the refined alignment available in electronic form at an output of said processor.

\* \* \* \* \*